Figure 1:
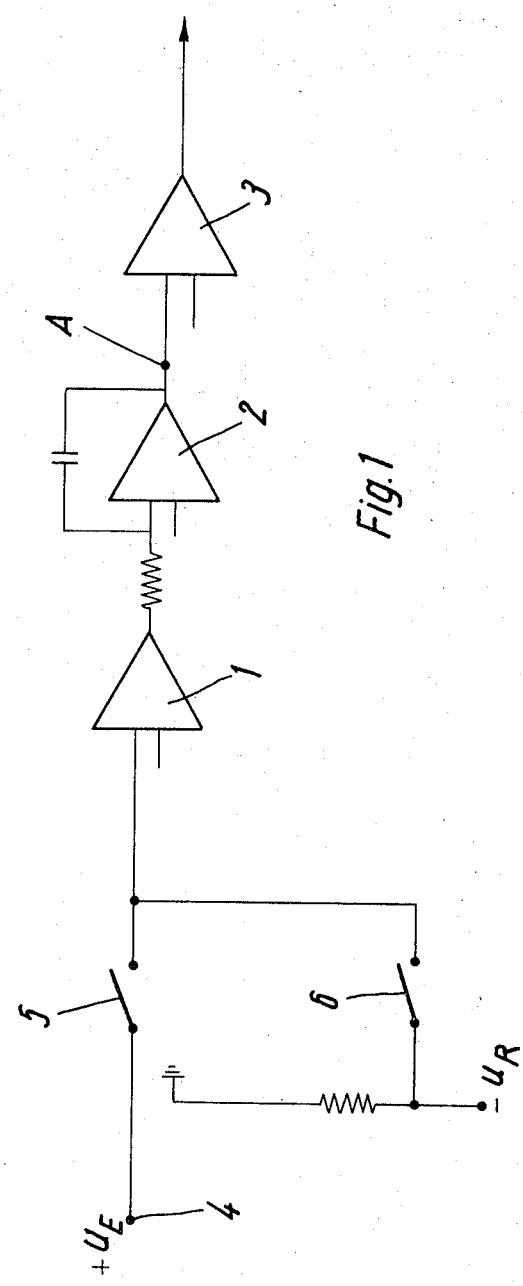

United States Patent [19]
Zschimmer

[11] 3,840,807
[45] Oct. 8, 1974

[54] METHOD AND APPARATUS FOR MEASURING A VOLTAGE WITH THE AID OF AN ANALOGUE-DIGITAL CONVERTER

[76] Inventor: Gero Zschimmer, Hubertusstrasse 10, 1 Berlin 41, Germany

[22] Filed: Mar. 22, 1972

[21] Appl. No.: 236,914

[30] Foreign Application Priority Data
Feb. 11, 1972 Germany............................ 2207416

[52] U.S. Cl................................. 324/111, 324/99 D
[51] Int. Cl.......................... G01r 17/06, G01r 1/00
[58] Field of Search................ 324/99 D, 99 R, 111

[56] References Cited
UNITED STATES PATENTS
3,500,109  3/1970  Sugiyama et al.................. 324/99 R
3,649,826  3/1972  Larsson et al. ................... 324/99 D

*Primary Examiner*—Alfred E. Smith
*Assistant Examiner*—Ernest F. Karlsen
*Attorney, Agent, or Firm*—Smythe & Moore

[57] ABSTRACT

The invention provides a method of measuring a voltage by means of an analogue-digital converter consisting of, preferably, a differential amplifier, an integrator and a comparator, in which method the voltage to be measured and subsequently a reference voltage are applied to the input of the converter, the integrator being maintained during the measuring process by means of an auxiliary voltage at a potential that in actual amount is greater than the voltage to be measured and preferably has the same sign as the reference voltage.

The invention further provides voltage measuring apparatus for performance of the above method wherein the output of the comparator is connected with an input of the differential amplifier, which in turn is connected with one side of a storage device, preferably a capacitor. Between the storage device and the comparator output is a switch, and an auxiliary voltage source is provided which can be applied to another input of the differential amplifier, of which the voltage in actual amount is larger than the voltage to be measured and which preferably has the same polarity as the reference voltage.

5 Claims, 6 Drawing Figures

METHOD AND APPARATUS FOR MEASURING A VOLTAGE WITH THE AID OF AN ANALOGUE-DIGITAL CONVERTER

The invention refers to a method of measurement of a voltage by means of an analogue-digital converter, consisting of, preferably, a differential amplifier, an integrator and a comparator, in which method the voltage to be measured and subsequently a reference voltage are applied to the input of the converter.

In known apparatus of this kind, difficulties arise in the measurement of positive and negative voltages, since the reference voltage has only one sign and the reference voltage and voltage to be measured must have opposite signs.

The object of the invention is to perform the above mentioned method in such a way that positive and negative voltages can be measured without difficulty with only one polarity of the reference voltage.

This problem is solved in accordance with the invention by maintaining the integrator during the measuring process by means of an auxiliary voltage at a potential that in actual amount is greater than the voltage to be measured and preferably has the same sign as the reference voltage.

In this way, the reference potential of the analogue-digital converter is so altered that opposition between the voltage to be measured, regardless of whether it is negative or positive, and the reference voltage is guaranteed.

Figure 2:
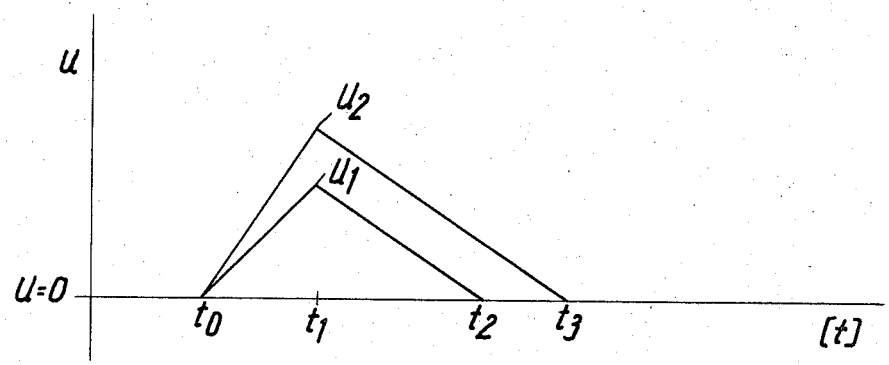
Figure 4:
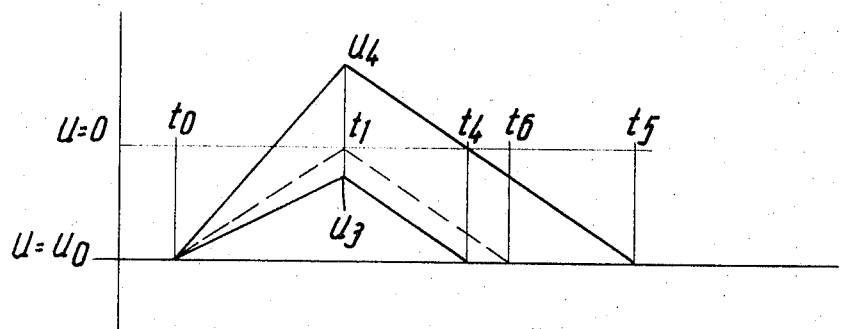
Figure 3:
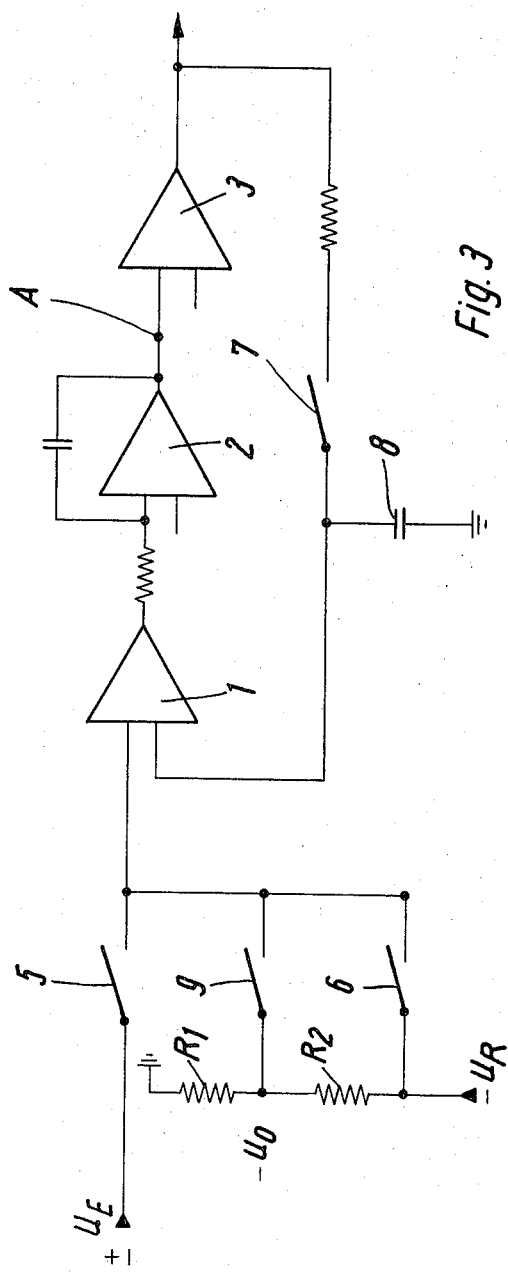

With the aid of the drawing the conditions are explained in detail. It shows in:

FIG. 1 a block diagram of a conventional analogue-digital converter;

FIG. 2 the behavior of the voltage with time at point A of the circuit as FIG. 1;

FIG. 3 a block diagram of a converter in accordance with the invention;

FIG. 4 the behavior of the voltage with time at point A of the circuit as FIG. 3.

Figure 5:
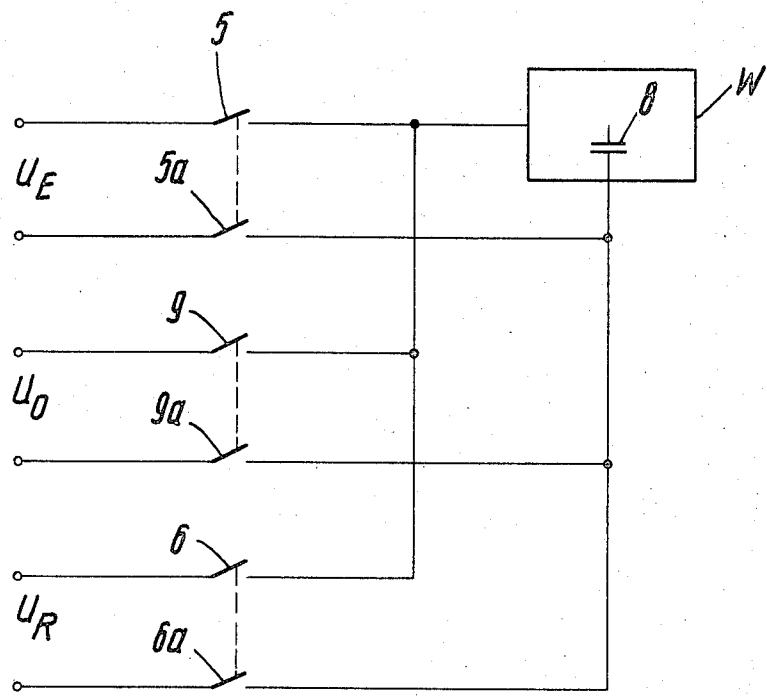

FIG. 5 a block diagram of the transducer in simplified form; and

Figure 6:
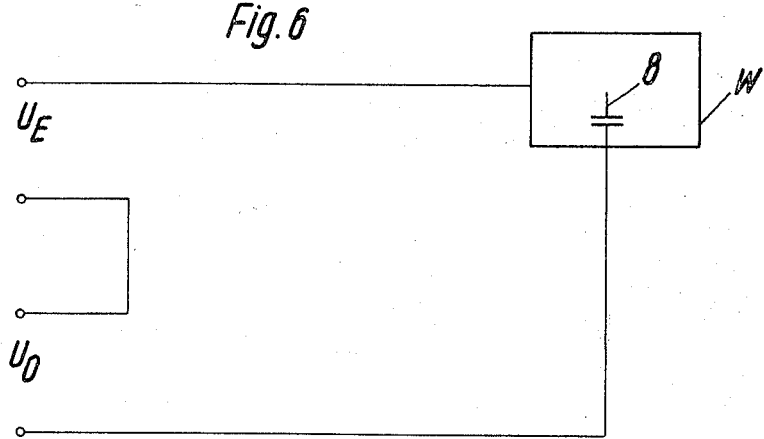

FIG. 6 a block diagram showing the way the apparatus of FIG. 5 is connected at one stage of the method of using the apparatus of FIG. 5.

In FIG. 1 a preamplifier in the form of a differential amplifier is indicated by 1, an intergrator by 2, and a comparator by 3. The three elements form the essential parts of an analogue-digital converter by which a voltage applied to the point 4 can be measured in digital form. The arrow on the right of the figure, issuing from the comparator 3, leads to the gate of a counter.

With the apparatus shown in FIG. 1 operation is as follows:

First of all, the voltage to be measured is applied to the apparatus by closing the switch 5. The voltage at point A then rises depending on the magnitude of the applied voltage to the value $U_1$ or $U_2$ (FIG. 2). Next the switch 5 is opened and the switch 6 is closed, with the result that a reference voltage $U_R$, which is opposed to the measurement voltage, is fed into the apparatus. This leads to a drop in the voltage at point A, whereby the falling curves all have the same slope. The time difference $t_2-t_1$ respectively $t_3-t_1$ is then a measure of the magnitude of the voltage to be measured.

The method described presupposes that the measurement voltage always has opposite polarity to the reference voltage.

In order to bring about that the measurement voltage can also have the same polarity as the reference voltage, a circuit can be provided according to the invention as example of which is shown in FIG. 3.

The output of the comparator 3 is connected with the second input of the differential amplifier 1 through a switch 7. This connection is in turn connected to earth through a capacitor 8. The reference voltage can, as shown in the drawing, be applied in full or in part to the first input of the differential amplifier by means of a voltage divider.

The sequence of the measuring process and the voltage conditions at point A (FIG. 3) appear from the following:

First of all, switches 7 and 9 are closed. In consequence, the voltage $-U_o$ is applied to the first input of the differential amplifier 1. If the analogue-digital converter by reason of the feedback has an amplification of about 1, then $-U_o$ also at point A (FIG. 3) and at the second input of the differential amplifier 1. The capacitor 8 likewise carries on one side of it the voltage $-U_o$ with respect to earth.

At the instant of time $t_o$, the switches 7 and 9 are opened and the switch 5 is closed. At this stage, the voltage $U_3$ to be measured is applied to the first input of the differential amplifier 1 (FIG. 4). This has with respect to earth a certain negative potential, but with respect to $-U_o$ a positive value. Consequently, the voltage at point A rises to the value $U_3$. At the instant of time $t_1$, in accordance with the known method, the reference voltage $U_R$ is applied to the first input of the differential amplifier 1 by opening the switch 5 and closing switch 6. The voltage at point A again falls. As soon as it has reached the voltage level $-U_o$ the time $(t_4-t_1)$, that represents a measure of the input voltage to be measured, relative to $-U_o$ has elapsed.

The voltage to be measured can also be positive with respect to earth. The conditions are shown by the curve which has its peak value at $U_4$: First of all the voltage rises in the time $t_o$ to $t_1$ from $-U_o$ to the value $U_4$. If the reference voltage is then applied at the instant $t_1$, the voltage at point A falls to $-U_o$. The time difference $t_5-t_1$ is a measure of the voltage which has been relative to $-U_o$.

In order to detect the voltage with respect to earth potential, one proceeds as follows: The conditions are so chosen in accordance with the invention that for the case $U_E = O (U_E = $ the voltage to be measured), the time $t_1-t_o$ and $t_1-t_o$ are equal (see the dotted line in FIG. 4). The counter of the digital metering system is allowed to run backwards from its maximum reading (e.g. 10000) from the instant of time $t_1$. Then at the instant $t_6$, it has reached zero. If the voltage to be measured is greater than zero, the counter must run forwards again from the instant $t_6$, whereby it must be shown in some way whether the direction of count has reversed or not. Positive and negative voltages under measurement are then correctly indicatd by the counter.

The method in accordance with the application has the further very essential advantage that by it a possible drift in the converter can be compensated. The reason for this consists in the following: Assuming the preamplifier has a drift (this can be thought of as an additional source of voltage existing in the preamplifier), then the additional voltage is communicated by the feedback to the second input of the preamplifier 1, which in the ensuing measurement has the effect that the drift does not show up.

In elaboration of the invention, it is advantageous if the auxiliary voltage is half as big as the reference voltage. That means in the example according to FIG. 3, that $R_1 = R_2$. In certain cases, it can also be expedient if the range of measurement is doubled. Then in accordance with the invention, $R_1$ must $= 2R_2$.

In further refinement of the invention, the method described can also be used for the measurement of resistances, that is, with the input (in FIG. 3, $U_E$) connected to the chassis, $R_1$ being an unknown and $R_2$ a known resistance or vice versa. The advantage of these resistance measurements consists in the fact that a supply connected on one side to the chassis and not essentially stabilized can be used. In addition it is significant that the current flowing in the resistances does not enter into the measurement; it depends only on the proportion $R_1/R_2$.

The auxiliary voltage can have any value. Thus, in accordance with the invention, a "suppressed" zero can also be set.

Again, it has been shown above that a correct indication of positive and negative voltages can be obtained in a simle manner, by letting the counter run backwards during a certain interval of time. By reversing the polarity of the comparator output in accordance with a further development of the invention the same result can be obtained.

Instead of one feedback loop as shown in FIG. 3, several feedback loops can also be provided. The point of this could be to increase the stability. Adjustment can be inserted beyond the preamplifier and in front of the integrator. The error existing in the preamplifier is then added to the input drift. The store 8 (FIG. 3) can also be connected at a different point, e.g. in the amplifier path.

The foregoing description has been based on the assumption that the reference voltage is constant. In a development of the invention, however, the input voltage can be fed partly to the input "0" (switch 5) and partly to the input for the reference potential (switch 6), in order to obtain in this way a non-linear characteristic of the input voltage. The polarity can be reversed too.

In a further development of the invention, an error existing at the integrator can be equalized by shifting the voltage $U_o$ from its desired value by the amount of the error. That can also be done by shifting the potential of the voltage of a capacitor connected in advance of the measurement input by the amount of the error by a voltage impulse during the measuring period. The shift can also be effected in the same form at the capacitor (8).

In a further embodiment of the method, the reference potentials of the transducer, including the storage device, which correspond to the reference potentials of the particular voltage to which they are connected, are partly or completely independent from each other.

Finally, it is suggested that the auxiliary voltage, the voltage to be measured and the reference voltage, all or only some, preferably the auxiliary voltage and the reference voltage, are connected in series in at least one of the stages of the method in accordance with the invention. This means that in the particular stage of the method in which the said series connection is effected, the connected voltage, for example the "new" auxiliary voltage, is made up of the two series connected voltages, for example the "old" auxiliary voltage and the "old" voltage to be measured whereby it is possible, according to demand, to add one voltage to the other in one (+−) or the other (−+) polarity. This has the advantage that non-linear characteristic curves can be produced in this way. The voltage can change accordingly. In addition to this, automatic polarity indication is also possible although the reference voltage has only one polarity.

FIGS. 5 and 6 show two further embodiments of the invention by way of example.

FIG. 5 shows the transducer in a simplified form and depicts it with "W." Only the storage device 8 is depicted. The different voltages $U_O$, $V_E$ and $U_R$ are supplied via the switches 9 − 9a, 5 − 5a and 6 − 6a. This arrangement permits reference potential-free measurement (in the circuit according to FIG. 3 the transducer and the storage device 8 are connected to chassis. Likewise, the reference potentials of the voltages $U_E$, $U_O$ and $U_R$ are chassis). For examle, if a resistance in a bridge arm is required to be measured with a wheatstone bridge then the voltage, which drops off in the diagonal branch, depends on the one hand on the detuning of the bridge (which is relevant), and on the other hand on the supply voltage (which is of less relevance). If the quotient is built up from the voltage in the diagonal branch and the supply voltage, then the second, non-interesting dependence, falls away. The two voltages are not interconnected via a common reference potential. The circuit according to FIG. 5 is therefore suitable for forming the said quotient, this in so far in that the voltage in the diagonal branch is supplied to the two contacts designated $U_E$ in FIG. 5 and that the supply voltage is fed to the contacts $U_R$. The advantage gained in this way, is that it is now possible to work with an unstable supply voltage.

FIG. 6 represents a circuit similar to that of FIG. 5 during one stage of the method, in which $U_E$ and $U_O$ are connected in series (the switches and the current paths which during this stage of the method do not pass current have been omitted for the sake of simplicity).

What is claimed is:

1. An analogue to digital converter for converting and measuring an analogue input signal to a digital output signal comprising a source of reference and auxiliary voltages, said reference and auxiliary voltages having the same polarity, a differential amplifier having first and second input terminals and an output terminal, an integrator having an input and output terminal, said integrator input terminal being connected to said differential amplifier output terminal, a comparator for generating the digital output signal having input and output terminals, said comparator input terminal being connected to said integrator output terminal, storage means for storing a signal, said storage means being connected to said differential amplifier second input terminal, first switch means for operably connecting said auxiliary voltage to said differential amplifier first input terminal, second switch means for operably connecting the analogue input signal to said differential amplifier first input terminal, third switch means for operably connecting the reference voltage to said differential amplifier first input terminal, fourth switch means for operably connecting said comparator output terminal to said storage means, and readout means for generating a readout indicative of digital values of the input analog signal, whereby said first and fourth switch means are first to be operated, said second switch means is second to be operated and said third switch means is third to be operated.

2. An analogue to digital converter as claimed in claim 1 wherein the auxiliary voltage is generated by connecting a voltage divider to said source of reference voltage.

3. An analogue to digital converter as claimed in claim 2 wherein the input signal is zero voltage and the resistance of said voltage divider is an unknown resistance, wherby the converter is employed to measure the unknown resistance.

4. An analogue to digital converter as claimed in claim 1 including a counter connected to said comparator output terminal, said counter counting after the operation of said second switch means.

5. An analogue to digital converter as claimed in claim 1 wherein said source of reference and auxiliary voltages is obtained from the analogue input voltage, whereby a non-linear characteristic is obtained.

* * * * *